US011204068B2

(12) United States Patent
Yahagi (10) Patent No.: US 11,204,068 B2
(45) Date of Patent: Dec. 21, 2021

(54) CLUTCH CONTROL DEVICE (71) Applicant: ISUZU MOTORS LIMITED, Tokyo (JP)

(72) Inventor: Shuuichi Yahagi, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 16/982,032

(22) PCT Filed: Mar. 14, 2019

(86) PCT No.: PCT/JP2019/010466
§ 371 (c)(1),
(2) Date: Sep. 17, 2020

(87) PCT Pub. No.: WO2019/181711
PCT Pub. Date: Sep. 26, 2019

(65) Prior Publication Data
US 2021/0025463 A1 Jan. 28, 2021

(30) Foreign Application Priority Data
Mar. 19, 2018 (JP) .............................. JP2018-050678

(51) Int. Cl.
F16D 48/06 (2006.01)
F16D 48/02 (2006.01)

(52) U.S. Cl.
CPC ........... *F16D 48/066* (2013.01); *F16D 25/14* (2013.01); *F16D 2500/1027* (2013.01); *F16D 2500/3024* (2013.01); *F16D 2500/3026* (2013.01)

(58) Field of Classification Search
CPC ............. F16D 25/00–14; F16D 48/066; F16D 2500/1027; F16D 2500/3024; F16D 2500/3026
(Continued)

(56) References Cited

U.S. PATENT DOCUMENTS 6,286,940 B1    9/2001  Sugiyama et al.
10,344,809 B2 * 7/2019  Gustin ............... F16D 25/0638
(Continued)

FOREIGN PATENT DOCUMENTS

CN    10647120 A    3/2017
GB    1383567 A *  2/1974 ............. F16D 48/02
(Continued)

OTHER PUBLICATIONS

International Search Report and Written Opinion for related JP App. No. PCT/JP2019/010466 ISR dated May 28, 2019. English translation provided; 8 pages.
(Continued)

Primary Examiner — Timothy Hannon
(74) Attorney, Agent, or Firm — Procopio, Cory, Hargreaves & Savitch LLP (57) ABSTRACT This clutch control device is provided with: a supply valve and a supply valve control unit, which control the supply of an operating fluid to a pressure chamber; a first discharge valve and a first discharge valve control unit, which control the discharge of the operating fluid in the pressure chamber; and a second discharge valve and a second discharge valve control unit, which control the discharge of the operating fluid in the pressure chamber. When it is determined that the engagement and disengagement switching of a clutch device 2, which is necessitated by the discharge of the operating fluid in the pressure chamber, is required, the first discharge valve is controlled to be opened and then the second discharge valve is controlled to be opened.

5 Claims, 5 Drawing Sheets (58) Field of Classification Search
USPC ...................................................... 192/85.63
See application file for complete search history.

(56) References Cited

U.S. PATENT DOCUMENTS

| | | |
|---|---|---|
| 2007/0007097 A1 | 1/2007 | Fraser et al. |
| 2010/0016119 A1 | 1/2010 | Petzold et al. |
| 2010/0152985 A1 | 6/2010 | Petzold et al. |
| 2018/0231073 A1 | 8/2018 | Gustin |

FOREIGN PATENT DOCUMENTS

| | | | |
|---|---|---|---|
| JP | 563101525 A | | 5/1988 |
| JP | H02097729 A | | 4/1990 |
| JP | H10-331871 A | | 5/1997 |
| JP | 10331871 A | * | 12/1998 |
| JP | H10337871 A | | 12/1998 |
| JP | 2009544922 T | | 12/2009 |
| JP | 2017020601 A | | 1/2017 |

OTHER PUBLICATIONS

The State Intellectual Property of People's Republic of China, The First Office Action, Application No. 201980020560.4, dated Jul. 5, 2021.

* cited by examiner

CLUTCH CONTROL DEVICE

CROSS-REFERENCE TO RELATED APPLICATIONS

This application is a U.S. National Stage entry of PCT Application No. PCT/JP2019/010466, filed on Mar. 14, 2019, which claims priority to JP Application No. 2018-050678, filed Mar. 19, 2018, The contents of the foregoing are incorporated by reference.

TECHNICAL FIELD

The present disclosure relates to a clutch control device configured to control disengagement and engagement of a clutch device by controlling supply and discharge of a working fluid to and from a clutch actuator.

BACKGROUND ART

There is known a technology in which a clutch, that is, a clutch device is arranged between an engine and a transmission mechanism, and disengagement and engagement of the clutch device is controlled so as to control transmission of a driving force between the engine and the transmission mechanism. Further, there is also known a technology of controlling disengagement and engagement of a clutch device using a fluid (working fluid) such as air or hydraulic oil.

For example, Patent Literature 1 discloses a clutch actuator for switching connection and disconnection (disengagement) of a clutch device. The clutch actuator includes an air chamber and an atmosphere chamber formed in a cylinder, and a piston movably provided in the cylinder. An elastic member is provided in the air chamber so as to push the piston against a load of the clutch. Further, two valve mechanisms corresponding to air supply valves tor allowing compressed air to flow into the air chamber, and two valve mechanisms corresponding to air discharge valves for discharging the compressed air from the air chamber are provided. By opening and closing these air supply valves and opening and closing these air discharge valves, connection and disconnection of the clutch can be switched.

CITATION LIST

Patent Literature

Patent Literature 1: JP-A-2017-20601

SUMMARY OF INVENTION

Technical Problem

In the above clutch device, in a state where the pressure of the air chamber in the cylinder is high, by opening these two valve mechanisms, the pressure in the air chamber drops rapidly, the movement of the piston occurs too early in terms of control, and eventually the movement of the piston beyond a target value thereof, that is, overshoot may occur. On the other hand, when the pressure in the air chamber decreases, the discharge of the compressed air from the air chamber becomes slow, and the responsiveness of the clutch may deteriorate.

Therefore, the technology of the present disclosure provides a clutch control device that suitably controls discharge of a working fluid from a cylinder of a clutch actuator which is for switching between disengagement and engagement of a clutch device.

Solution to Problem

A technology of the present disclosure provides a clutch control device configured to control switching between disengagement and engagement of a clutch device by adjusting an urging force of a spring member to a clutch member in the clutch device, the urging force being adjusted by controlling movement of a piston of a clutch actuator, and the clutch actuator including a pressure chamber formed in a cylinder, and the piston provided movably in the cylinder in accordance with pressure of a working fluid in the pressure chamber, the clutch control device including: at least one supply valve for controlling supply of the working fluid to the pressure chamber; a supply valve control unit configured to control operation of the at least one supply valve; a first discharge valve for controlling discharge of the working fluid in the pressure chamber; a second discharge valve for controlling the discharge of the working fluid in the pressure chamber; a first discharge valve control unit configured to control operation of the first discharge valve; a second discharge valve control unit configured to control operation of the second discharge valve; and an operation determination unit configured to perform an operation determination of the clutch device, in which when it is determined by the operation determination unit that a disengagement and engagement switching process of the clutch device by discharging the working fluid from the pressure chamber is necessary, the second discharge valve control unit performs opening control on the second discharge valve after opening control is performed on the first discharge valve by the first discharge valve control unit.

In the above clutch control device, the second discharge valve control unit may be configured to perform the opening control on the second discharge valve when pressure of the pressure chamber becomes lower than a predetermined pressure lower than the pressure of the pressure chamber when the first discharge valve is opened.

The above clutch control device may further include a stroke sensor configured to detect a stroke value of the piston. In this case, at least one of the first discharge valve control unit and the second discharge valve control unit may execute valve control in accordance with the stroke value acquired based on an output from the stroke sensor. Alternatively, the above clutch control device may further include a pressure estimation unit configured to estimate pressure of the pressure chamber. In this case, at least one of the first discharge valve control unit and the second discharge valve control unit may execute valve control in accordance with a value estimated by the pressure estimation unit.

Advantageous Effects of Invention

Therefore, according to the technology of the present disclosure, with the above configuration, it is possible to suitably control the discharge of the working fluid from the pressure chamber in the cylinder of the clutch actuator which is for switching between disengagement and engagement of the clutch device.

DESCRIPTION OF EMBODIMENTS

Hereinafter, an embodiment according to the present disclosure is described with reference to the drawings. The same components are denoted by the same reference numerals, and names and functions of these components are also the same. Therefore, detailed descriptions of the same components are not repeated.

Figure 1:
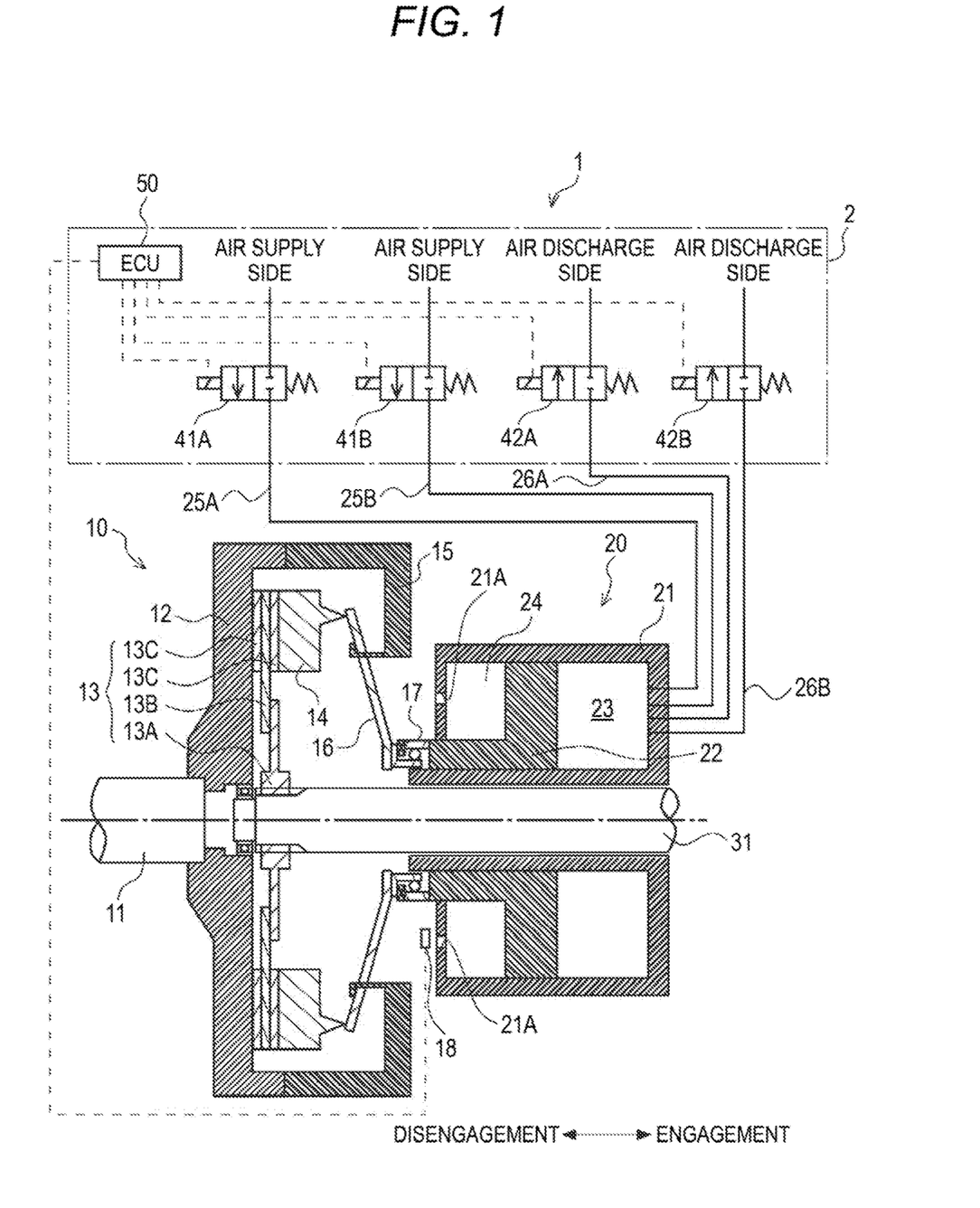
FIG. 1 is a schematic configuration diagram of a clutch system to which a clutch control device according to an embodiment of the present disclosure is applied.

FIG. 1 is a schematic configuration diagram of a clutch system 1 including a clutch control device 2 according to an embodiment of the technology of the present disclosure.

The clutch system 1 includes a clutch device 10, a clutch actuator 20, the clutch control device 2, and a stroke sensor 18.

The clutch device 10 includes a flywheel 12, a clutch disc 13, a pressure plate 14, a clutch cover 15, a diaphragm spring 16, and a release bearing 17. The clutch disc 13 configures a clutch member, and the diaphragm spring 16 is a spring member, that is, an elastic, member.

The flywheel 12 is integrally rotatably connected to a crankshaft 11 to which a driving force of an engine (not shown) is transmitted. The clutch cover 15 is fixed to an outer peripheral edge of the flywheel 12 on a side opposite to the crankshaft 11.

The clutch disc 13 includes a mounting portion 13A which is arranged coaxially with the crankshaft 11 and is spline-fitted to an input shaft 31 of a transmission (not shown) so as to be axially movable and integrally rotatable, an annular disc main body portion 13B fixed to an outer peripheral portion of the mounting portion 13A, and friction plates 13C fixed on both sides of an outer edge portion of the disc main body portion 13B.

The pressure plate 14 is arranged on the clutch disc 13 on a side opposite to the flywheel 12 so as to be able to contact the friction plate 13C. The diaphragm spring 16 is arranged such that an outer edge portion thereof is able to contact a surface of the pressure plate 14 on the side opposite to the flywheel 12, and therefore, when the pressure plate 14 is pressed by the diaphragm spring 16, the clutch disc 13 can be pressed against the flywheel 12. When not being pressed by the diaphragm spring 16, the pressure plate 14 is moved to the side opposite to the flywheel 12 by a spring (not shown), so that the clutch disc 13 is not pressed against the flywheel 12.

The diaphragm spring 16 is a substantially conical spring member in a state with no load, and an intermediate portion of the diaphragm spring 16 between an inner edge portion and the outer edge portion is attached to the clutch cover 15. The outer edge portion of the diaphragm spring 16 is arranged so as to come into contact with the pressure plate 14 on the side opposite to the flywheel 12, and the inner edge portion of the diaphragm spring 16 is arranged so as to come into contact with a surface of the release bearing 17 on a flywheel 17 side.

In the present embodiment, when the release bearing 17 does not press the inner edge portion of the diaphragm spring 16 toward the flywheel 12 side, the outer edge portion of the diaphragm spring 16 presses the pressure plate 14 toward the flywheel 12, so that the clutch disc 13 is pressed against the flywheel 12, that is, the clutch device 10 is brought into an engagement state. In short, the diaphragm spring 16 is configured to act by exerting an urging force on the clutch member 13. On the other hand, when the release bearing 17 presses the inner edge portion of the diaphragm spring 16 toward the diaphragm spring 12 side, the outer edge portion of the diaphragm spring 16 moves toward the side opposite to the flywheel 12, and the outer edge portion of the diaphragm spring 16 does not press the pressure plate 14, so that the clutch disc 13 is not pressed against the flywheel 12, that is, the clutch device 10 is brought into a disengagement state. In short, in this way, the urging force applied from the diaphragm spring 16 to the clutch disc 13 serving as the clutch member is eliminated.

The release bearing 17 is configured such that a flywheel 12 side of an inner ring contacts the inner edge portion of the diaphragm spring 16, and a side opposite to the flywheel 12 of an outer ring is connected to a piston 22 of the clutch actuator 20 described later, so that the diaphragm spring 16 and the piston 22 are rotatable relative to each other, and the release bearing 17 is movable in an axial direction of the input shaft 31 as the piston 22 moves in the axial direction.

The clutch actuator 20 has a cylinder 21 (as a cylinder member) arranged so as to be relatively rotatable around the input shaft 31, and a piston 22 (as a piston member) provided inside the cylinder 21 so as to be movable in the axial direction. A pressure chamber 23 is formed by a surface of the piston 22 on the side opposite to the flywheel 12 and an inner wall of the cylinder 21, and an open chamber 24 is formed by an outer peripheral surface of the piston 22, a surface of the piston 22 on the flywheel 12 side, and the inner wall of the cylinder 21.

The cylinder 21 is provided with supply pipes 25A and 25B for supplying air (an example of a working fluid) into the pressure chamber 23 and discharge pipes 26A and 26B for discharging the air from the pressure chamber 23. Here, since air is used as the working fluid, the supply pipes 25A and 25B may be referred to as an air supply pipe, and the discharge pipes 26A and 26B may be referred to as an air discharge pipe. Further, the cylinder 21 is formed with an opening hole 21A for communicating the open chamber 24 with the outside (for example, the outside under atmospheric pressure).

According to the clutch actuator 20, by supplying air into the pressure chamber 23, the piston 22 can be moved toward the flywheel 12 side, acid the clutch device 10 can be brought into the disengagement state. On the other hand, by discharging air from the pressure chamber 23, the piston 22 can be moved toward the side opposite to the flywheel 12 by an elastic force of the diaphragm spring 16, and the clutch device 10 can be brought into the engagement state.

The clutch control device 2 includes a first supply valve 41A and a second supply valve 41B arranged in parallel between a supply side for supplying air and the supply pipes 25A, 25B, a first discharge valve 42A and a second discharge valve 42B arranged in parallel between a discharge side for discharging air and the discharge pipes 26A, 26B, and a control device including a functional unit configured to control these valves 41A, 41B, 42A, and 42B separately. The control device corresponds to an electronic control unit (ECU) 50. That is, the ECU 50 includes a first supply valve control unit 50A configured to control operation of the first supply valve 41A, a second supply valve control unit 50B configured to control operation of the second supply valve 41B, a first discharge valve control unit 50C configured to control operation of the first discharge valve 42A, and a second discharge valve control unit 50D configured to control operation of the second discharge valve 42B. Further, the ECU 50 includes an operation determination unit 50E configured to make an operation determination of the clutch device 10. The operation determination of the clutch device 10 made by the operation determination unit 50E includes determination of whether it is necessary to perform an engagement process of the clutch device 10, that is, a clutch engagement process, determination of whether to end the clutch engagement process, determination of whether it is necessary to perform an disengagement process of the clutch device 10, that is, a clutch disengagement process, and determination of whether to end the clutch disengagement process. These functional units 50A, 50B, 50C, 50D, 50E are associated with each other and electrically connected. Although not shown, compressed air having a predetermined pressure or higher is stored by a pump drive in the tank at a position different from the supply pipes 25A, 25B side of the supply valves 41A, 41B in FIG. 1.

The ECU 50 includes a known arithmetic device (for example, a central processing unit (CPU)), a storage device (for example, read only memory (ROM), random access memory (RAM)), an input/output port and the like, and has a so-called computer configuration. Here, the ECU 50 is provided with a functional unit as a control device of the clutch system 1 as described above. Although the ECU 50 also includes various functional units for the control of the engine, the control of the transmission, and the like, the ECU 50 may not include such functional units, and a description thereof is omitted below.

Figure 2:
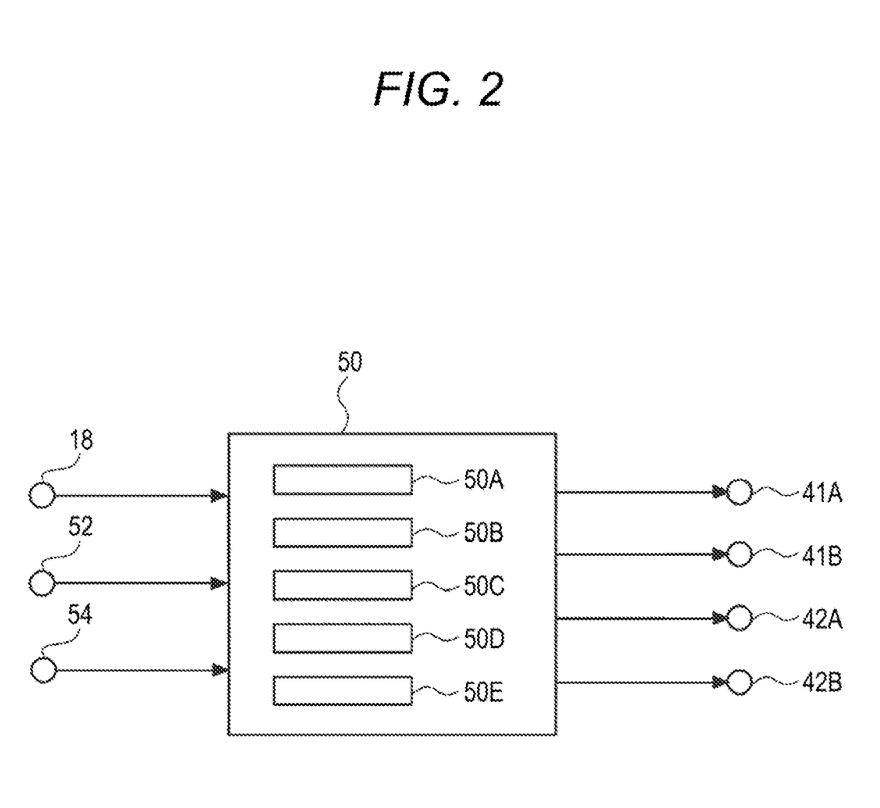
FIG. 2 is a block diagram of a control device in the clutch system of FIG. 1.

As shown in FIGS. 1 and 2, the stroke sensor 18 is connected to the ECU 50, and the output thereof is input to the ECU 50. The stroke sensor 18 is provided to detect a movement amount of the piston 22 of the clutch actuator 20 from a predetermined reference position, that is, a stroke value. Based on the output of the stroke sensor 18, the ECU 50 can acquire the stroke value of the piston 22. Further, the ECU 50 is configured to receive output of various sensors, for example, a vehicle speed sensor 52 for detecting a vehicle speed, and an accelerator opening degree sensor 54 for detecting an amount of depression of an accelerator pedal operated by the driver, that is, an accelerator opening degree (see FIG. 2). The output of these sensors may be received directly or indirectly. Therefore, the ECU 50 can acquire the vehicle speed based on the output of the vehicle speed sensor 52, and can acquire the accelerator opening degree based on the output of the accelerator opening degree sensor 54. Although not shown, the ECU 50 is also configured to receive output of an engine rotation speed sensor or the like for detecting an engine rotation speed, but the illustration thereof is omitted.

Under the control of the ECU 50, each of the supply valves 41A and 41B can be switched between a state in which the supply side (air supply side in FIG. 1) and the pressure chamber 23 are communicated with each other to supply air (supply state), and a state in which the supply side and the pressure chamber 23 are shut off to stop the air supply (supply stopped state). Further, under the control of the ECU 50, each of the discharge valves 42A and 42B can be switched between a state in which the discharge side (air discharge side in FIG. 1) and the pressure chamber 23 are communicated with each other to discharge air (discharge state), and a state in which the discharge side and the pressure chamber 23 are shut off to stop the air discharge (discharge stopped state). Here, each of these valves 41A, 41B, 42A, and 42B is controlled by so-called duty control by the ECU 50.

Next, control of the clutch device 10 by the clutch control device 2 in the clutch system 1 according to the present embodiment will be described.

Figure 3:
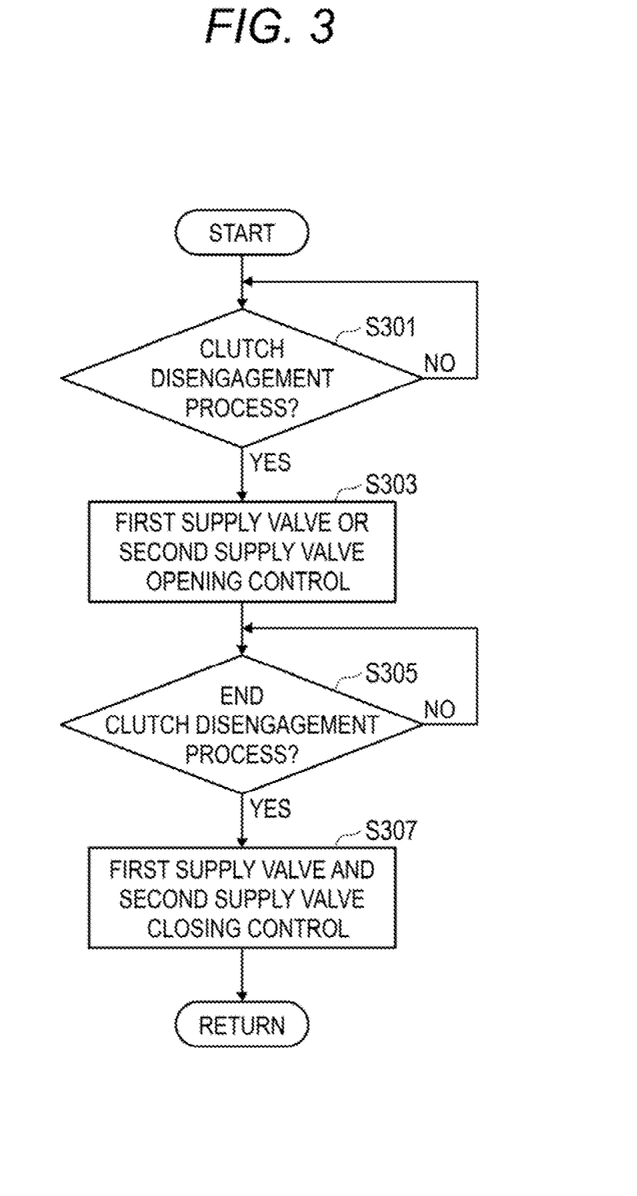
FIG. 3 is a flowchart of clutch disengagement process control in the control device of FIG. 2.

FIG. 3 is a flowchart of the clutch disengagement process according to the present embodiment. The clutch disengagement process is a process performed when the clutch device 10 is in the engagement state.

The calculation and control according to a routine of the clutch disengagement process of FIG. 3 is started, for example, when the power of the vehicle is turned on (a key switch of an ignition switch is turned on).

A clutch operation determination unit 50E serving as the operation determination unit determines whether it is necessary to start the clutch disengagement process in order to perform gear shift by the transmission, based on a vehicle speed acquired based on the output from the vehicle speed sensor 52, and an accelerator opening degree acquired based on the output from the accelerator opening degree sensor 54, and the like (step S301). When the determination result is that (the start of) the clutch disengagement process (one of disengagement and engagement switching process of the clutch device 10) is necessary (YES in step S301), the process proceeds to step S303. On the other hand, when the determination result is that it is not necessary to start the clutch disengagement process (NO in step S301), step S301 is executed again.

When receiving from the clutch operation determination unit 50E the output of the determination result that the clutch disengagement process is necessary, the first supply valve control unit 50A and the second supply valve control unit 50B execute opening control of the corresponding first supply valve 41A and second supply valve 41B respectively so as to perform the clutch disengagement process (step S303). At this time, both the first supply valve 41A and the second supply valve 41B may be subjected to the opening control at the same time, or only one of them may be subjected to the opening control, or any one of them may be subjected to the opening control and then the other is subjected to the opening control.

Then, the clutch operation determination unit 50E determines whether to end the clutch disengagement process, that is, determines whether the stroke value acquired based on the output from the stroke sensor 18 reaches a stroke value in a clutch disengagement state (first predetermined value) (step S305). Then, if the stroke reaches the stroke value in the clutch disengagement state (YES in step S305), the clutch operation determination unit 50E outputs a signal to stop the clutch operation to the first supply valve control unit 50A and the second supply valve control unit 50B. As a result, closing control of closing both the first supply valve 41A and the second supply valve 41B is executed (step S307).

Figure 4:
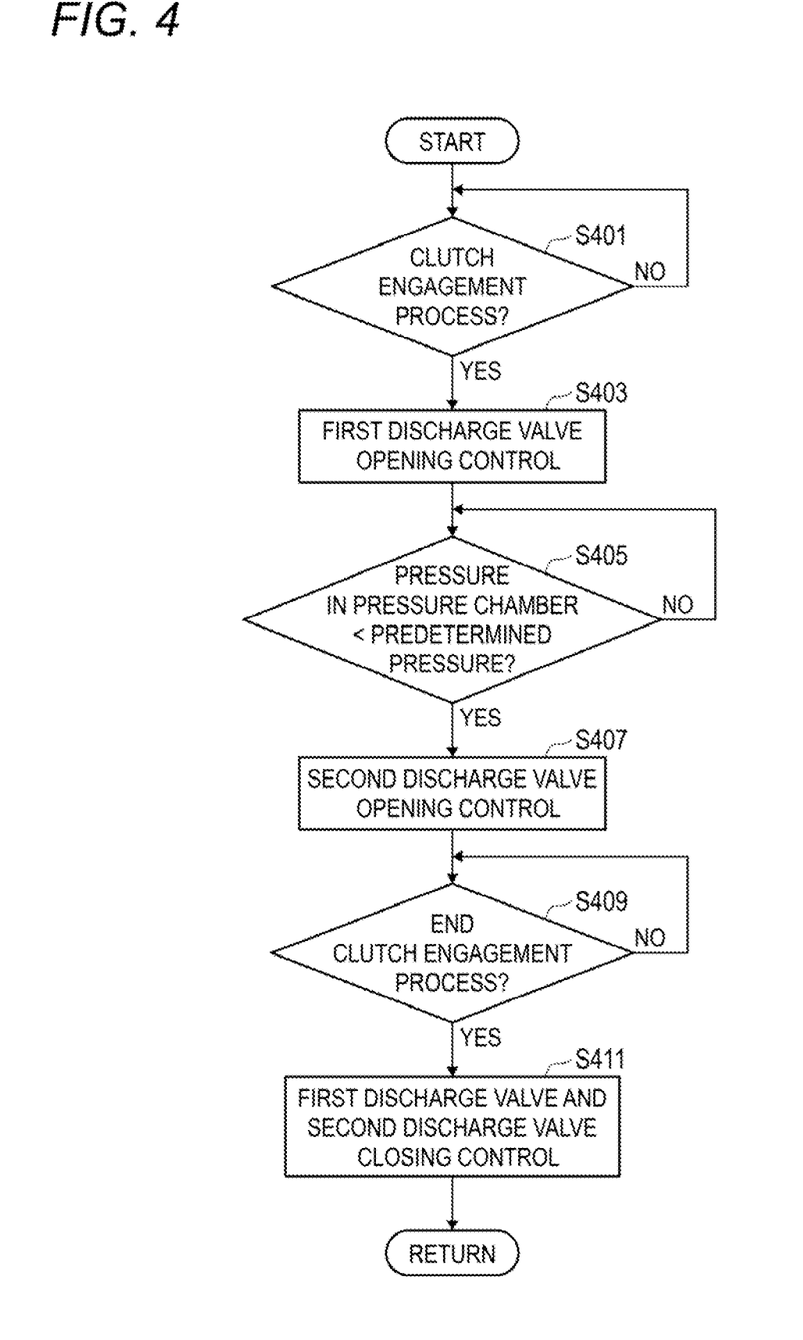
FIG. 4 is a flowchart of clutch engagement process control in the control device of FIG. 2.

FIG. 4 is a flowchart of the clutch engagement process according to the present embodiment. The clutch engagement process is a process performed when the clutch device 10 is in the disengagement state.

The calculation and control according to a routine of the clutch engagement process of FIG. 4 is started, for example, when the power of the vehicle is turned on (a key switch of an ignition switch is turned on).

The clutch operation determination unit 50E determines whether it is necessary to start the clutch engagement process after the gear shift by the transmission is completed (step S401). When the determination result is that (the start of) the clutch engagement process (one of the disengagement and engagement switching process of the clutch device 10) is necessary (YES in step S401), the process proceeds to step S403. When the determination result is that it is not necessary to start the clutch engagement process (NO in step S401), the determination step in step S401 is repeatedly executed.

When receiving from the clutch operation determination unit 50E the output of the determination result that the clutch engagement process is necessary, the first discharge valve control unit 50C performs opening control on the first discharge valve 42A (step S403). At this time, the second discharge valve 50D does not receive an output corresponding to the opening control of the second discharge valve 42B from the clutch operation determination unit 50E.

Then, the clutch operation determination unit 50E determines whether the pressure in the pressure chamber 23 is lower than a predetermined pressure lower than a pressure of the pressure chamber 23 when the first discharge valve 42A is opened (step S405). Specifically, as the determination, it is determined whether the stroke acquired based on the output from the stroke sensor 18 is less than a predetermined value, which is in a state between the clutch disengagement state and the clutch engagement state. This determination determines whether the acquired stroke value reaches a stroke value (second predetermined value S2) between a stroke value in the clutch disengagement state (first predetermined value S1) and a stroke value in the clutch engagement state (third predetermined value S3). Then, if the stroke is less than the predetermined value (YES in step S405), the clutch operation determination unit 50E outputs a signal for executing a second stage of the clutch engagement operation to the second discharge valve control unit 50D. As a result, the second discharge valve 42B is subjected to the opening control in a state where the first discharge valve 42A is already opened (step S407). The predetermined pressure in step S405 and the predetermined value corresponding thereto are set in advance based on experiments and the like as a value at which the dischargeability of the working fluid from the pressure chamber 23 drops equal to or below a predetermined level, that is, a value at which the clutch responsiveness falls equal to or below a predetermined response level.

Then, the clutch operation determination unit 50E determines whether to end the clutch engagement process, that is, determines whether the stroke value acquired based on the output from the stroke sensor 18 reaches the stroke value in the clutch engagement state (third predetermined value S3) (step S409). Then, if the stroke value reaches the stroke value in the clutch engagement state (YES in step S409), the clutch operation determination unit 50E outputs a signal to stop the clutch operation to the first discharge valve control unit 50C and the second discharge valve control unit 50D. As a result, closing control of closing both the first discharge valve 42A and the second discharge valve 42B is executed (step S411).

Figure 5:
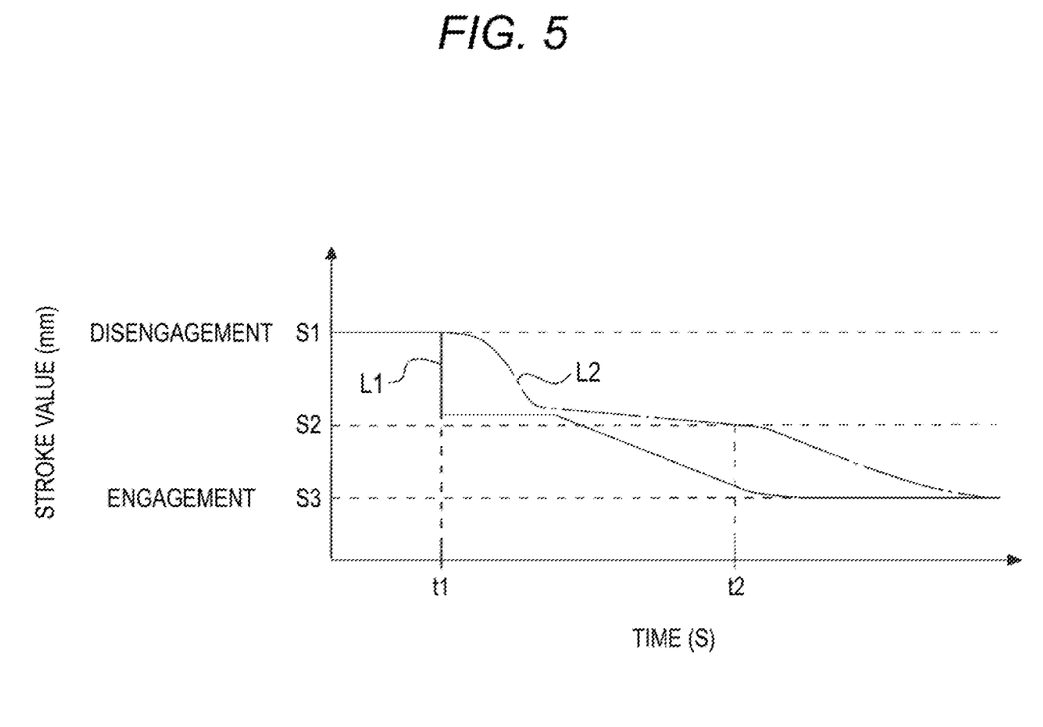
FIG. 5 is a diagram showing an example of stroke change of a piston of a clutch actuator in the clutch engagement process in the control device of FIG. 2.

The clutch engagement process is further described with reference to FIG. 5. FIG. 5 shows an example of changes in the stroke with the horizontal axis representing time and the vertical axis representing the stroke of the piston 22. In FIG. 5, a solid line (line L1) shows an example of change in target value in terms of control, and a dashed line (line L2) shows an example of changes in the stroke of the piston 22 by the clutch engagement process control. "S1" on the vertical axis of FIG. 5 corresponds to the stroke value in the clutch disengagement state, "S3" corresponds to the stroke in the clutch engagement state, and "S2" corresponds to the predetermined value in step S405.

When the clutch engagement process is started at time t1 (YES in step S401 of FIG. 4), the first discharge valve 42A is subjected to the opening control (step S403). At this time, only the first discharge valve 42A is opened, but since the pressure of air, which is the working fluid in the pressure chamber 23, is high, the working fluid can be quickly discharged from the pressure chamber 23 due to the pressure difference inside and outside the pressure chamber, and thus the stroke of the piston 22 can be changed rapidly. As a result, the stroke value detected by the piston 22 can be close to the target value.

However, since the pressure of the working fluid in the pressure chamber 23 becomes lower than the predetermined pressure from a certain time, the discharge of the working fluid via the first discharge valve 42A starts to be delayed. As a result, the difference between the target value in terms of control and the stroke detected by the piston 22 begins to increase.

Therefore, a predetermined value as a stroke value corresponding to such a predetermined pressure is obtained in advance by experiments or the like, and when the detected stroke value becomes less than the predetermined value (YES in step S405), the second discharge valve 42B is subjected to the opening control (step S407). As a result, both the first discharge valve 42A and the second discharge valve 42B are opened. Therefore, even if the pressure of the working fluid in the pressure chamber 23 is low, the working fluid can be suitably discharged from the pressure chamber 23. Therefore, it is possible to prevent the operation delay in the clutch engagement process.

In the above embodiment, the stroke value of the piston 22 is detected, and the first discharge valve and the second discharge valve are controlled based an the stroke value. This is because the stroke of the piston has a correlation with the internal pressure of the working fluid in the pressure chamber 23. Therefore, instead of the stroke sensor 18, a pressure sensor for detecting the internal pressure of the pressure chamber 23 may be provided, and the first discharge valve and the second discharge valve may be controlled based on the internal pressure based on the output of the pressure sensor. Alternatively, the ECU 50 may estimate the internal pressure of the pressure chamber based on the acquired stroke value. In this case, the ECU 50 may store data or a relational expression indicating the relation between the stroke value and the internal pressure of the pressure chamber, which is determined in advance based on experiments or the like. As a result, the functional unit corresponding to a pressure estimation unit of the ECU 50 can estimate the pressure of the pressure chamber with the acquired stroke value for controlling of the various valves, for example.

Further, in the above embodiment, two discharge valves are provided, but three or more discharge valves may be provided. Similarly, three or more supply valves may be provided. However, at least one valve may be provided as the supply valve. That is, the ECU 50 may include a supply valve control unit configured to control operation of at least one supply valve.

The present disclosure is not limited to the above-described embodiment, and can be appropriately modified and implemented without departing from the scope of the present disclosure.

For example, in the above embodiment, the clutch system 1 is configured such that the clutch device 10 is brought into the disengagement state by supplying the working fluid to the pressure chamber 23 of the cylinder 21 of the clutch actuator 20, and the clutch device 10 is brought into the engagement state by discharging the working fluid. However, the technology of the present disclosure is not limited to this, and the clutch system may also be configured such that the clutch device is brought into the engagement state by supplying the working fluid to the pressure chamber of the cylinder of the clutch actuator, and the clutch device is brought into the disengagement state by discharging the working fluid from the pressure chamber. That is, the diaphragm spring 16 may be provided so as to generate an urging force in a direction to bring the clutch member into the engagement state as in the above embodiment, or conversely, may be provided so as to generate an urging force in a direction to bring the clutch member into the disengagement state.

Further, in the above embodiment, although detailed description of the valve control is omitted, feedforward control or feedback control may be executed as the valve control. For example, the opening degree of the valve in an open state may be finely adjusted and controlled so that the stroke value detected based on the of the stroke sensor 18 follows the target value. Further, PID control may be performed as feedback control.

Further, in the above embodiment, the example in which air is used as the working fluid is shown, but the technology of the present disclosure is not limited to this, and hydraulic oil may be used as the working fluid.

The present application is based on Japanese Patent Application (No. 2018-050678) filed on Mar. 19, 2018, contents of which are incorporated herein as reference.

INDUSTRIAL APPLICABILITY

According to the present disclosure, it is possible: to suitably control the discharge of a working fluid from a pressure chamber in a cylinder of a clutch actuator which is for switching between disengagement and engagement of a clutch device.

REFERENCE SIGNS LIST 1 clutch system
2 clutch control device
10 clutch device
11 crankshaft
12 flywheel
13 clutch disc
14 pressure plate
15 clutch case
16 diaphragm sprig
17 release bearing
18 stroke sensor
20 clutch actuator
21 cylinder
22 piston
23 pressure chamber
24 open chamber
31 input shaft
41A first supply valve
41B second supply valve
42A first discharge valve
42B second discharge valve
50 ECU (control device)

The invention claimed is:

1. A clutch control device configured to control switching between disengagement and engagement of a clutch device by adjusting an urging force of a spring member to a clutch member in the clutch device, the urging force being adjusted by controlling movement of a piston of a clutch actuator, and the clutch actuator including a pressure chamber formed in a cylinder and the piston provided movably in the cylinder in accordance with pressure of a working fluid in the pressure chamber, the clutch control device comprising:
  at least one supply valve for controlling supply of the working fluid to the pressure chamber;
  a first discharge valve for controlling discharge of the working fluid in the pressure chamber;
  a second discharge valve for controlling the discharge of the working fluid in the pressure chamber, the second discharge valve and the first discharge valve are connected in parallel; and
  an electronic control unit configured to:
    control operation of the at least one supply valve;
    control operation of the first discharge valve;
    perform an operation determination of the clutch device,
  wherein, when it is determined by the operation determination that a disengagement and engagement switching process of the clutch device by discharging the working fluid from the pressure chamber is necessary, the electronic control unit performs opening control on the second discharge valve after opening control is performed on the first discharge valve by the electronic control unit,
  wherein the electronic control unit is configured to:
    determine whether pressure of the pressure chamber becomes lower than a predetermined pressure lower than the pressure of the pressure chamber when the first discharge valve is opened; and
    perform the opening control on the second discharge valve in a case where the electronic control unit determines that the pressure of the pressure chamber becomes lower than the predetermined pressure lower than the pressure of the pressure chamber when the first discharge valve is opened.

2. The clutch control device according to claim 1, further comprising:
  a stroke sensor configured to detect a stroke value of the piston,
  wherein the electronic control unit controls at least one of the first discharge valve and the second discharge valve in accordance with the stroke value acquired based on an output from the stroke sensor.

3. The clutch control device according to claim 1,
  wherein the electronic control unit is further configured to estimate pressure of the pressure chamber, and
  wherein the electronic control unit controls at least one of the first discharge valve and the second discharge valve in accordance with the estimated pressure of the pressure chamber.

4. The clutch control device according to claim 1,
  wherein the electronic control unit is further configured to estimate the pressure of the pressure chamber, and
  wherein the electronic control unit controls at least one of the first discharge valve and the second discharge valve in accordance with the estimated pressure of the pressure chamber.

5. A clutch control device configured to control switching between disengagement and engagement of a clutch device by adjusting an urging force of a spring member to a clutch member in the clutch device, the urging force being adjusted by controlling movement of a piston of a clutch actuator, and the clutch actuator including a pressure chamber formed in a cylinder and the piston provided movably in the cylinder in accordance with pressure of a working fluid in the pressure chamber, the clutch control device comprising:
- at least one supply valve for controlling supply of the working fluid to the pressure chamber;
- a supply valve control unit configured to control operation of the at least one supply valve;
- a first discharge valve for controlling discharge of the working fluid in the pressure chamber;
- a second discharge valve for controlling the discharge of the working fluid in the pressure chamber, the second discharge valve and the first discharge valve are connected in parallel;
- a first discharge valve control unit configured to control operation of the first discharge valve;
- a second discharge valve control unit configured to control operation of the second discharge valve; and
- an operation determination unit configured to perform an operation determination of the clutch device, wherein, when it is determined by the operation determination unit that a disengagement and engagement switching process of the clutch device by discharging the working fluid from the pressure chamber is necessary, the second discharge valve control unit performs opening control on the second discharge valve after opening control is performed on the first discharge valve by the first discharge valve control unit, wherein the operation determination unit is configured to:
- determine whether pressure of the pressure chamber becomes lower than a predetermined pressure lower than the pressure of the pressure chamber when the first discharge valve is opened; and
- perform the opening control on the second discharge valve in a case where the electronic control unit determines that the pressure of the pressure chamber becomes lower than the predetermined pressure lower than the pressure of the pressure chamber when the first discharge valve is opened.

* * * * *